US012575709B2

(12) United States Patent
Kim et al.

(10) Patent No.: US 12,575,709 B2
(45) Date of Patent: Mar. 17, 2026

(54) DISHWASHER

(71) Applicant: LG ELECTRONICS INC., Seoul (KR)

(72) Inventors: Jongyoung Kim, Seoul (KR); Dongho Lee, Seoul (KR); Kyung Rae Kim, Seoul (KR); Min Jae Jeong, Seoul (KR); Jeong In Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 109 days.

(21) Appl. No.: 18/294,272

(22) PCT Filed: Jul. 12, 2022

(86) PCT No.: PCT/KR2022/010154
§ 371 (c)(1),
(2) Date: Feb. 1, 2024

(87) PCT Pub. No.: WO2023/013913
PCT Pub. Date: Feb. 9, 2023

(65) Prior Publication Data
US 2024/0335084 A1 Oct. 10, 2024

(30) Foreign Application Priority Data
Aug. 3, 2021 (KR) ........................ 10-2021-0102066

(51) Int. Cl.
*A47L 15/42* (2006.01)
*A47L 15/48* (2006.01)
*F16F 15/08* (2006.01)

(52) U.S. Cl.
CPC ......... *A47L 15/4209* (2016.11); *A47L 15/486* (2013.01); *A47L 15/488* (2013.01);
(Continued)

(58) Field of Classification Search
CPC ...... A47L 15/48; A47L 15/486; A47L 15/488; A47L 15/4209; A47L 15/4272; F16F 15/08
See application file for complete search history.

(56) References Cited

U.S. PATENT DOCUMENTS

2010/0126166 A1* 5/2010 Pike .................... A47L 15/4259
60/527
2017/0319045 A1* 11/2017 Wu ........................ A47L 15/488
(Continued)

FOREIGN PATENT DOCUMENTS

DE 102013113508 A1 6/2015
DE 102015211193 A1 12/2016
(Continued)

OTHER PUBLICATIONS

Machine Translation of JP 4712679 B2 to Yamaguchi et al. Jun. 2011 (Year: 2011).*
(Continued)

*Primary Examiner* — Benjamin L Osterhout
(74) *Attorney, Agent, or Firm* — Fish & Richardson P.C.

(57) ABSTRACT

The present invention relates to a dishwasher which can effectively prevent a drying air supply part or a base from being damaged by a vibration occurring during a washing operation and an external impact resulting from, for example, a drop test, can prevent the drying air supply part from physically coming into direct contact with the base, and can minimize the amount of heat transferred from the drying air supply part to the base.

19 Claims, 12 Drawing Sheets

(52) U.S. Cl.
     CPC ........... *A47L 15/4272* (2013.01); *A47L 15/48*
                 (2013.01); *F16F 15/08* (2013.01)

(56)         References Cited

U.S. PATENT DOCUMENTS

| | | | | |
|---|---|---|---|---|
| 2018/0338667 A1* | 11/2018 | Hahm | ................. | A47L 15/4221 |
| 2019/0335974 A1* | 11/2019 | Kopera | ............... | A47L 15/4251 |
| 2022/0125276 A1* | 4/2022 | Kim | .................... | A47L 15/4246 |

FOREIGN PATENT DOCUMENTS

| | | | | | |
|---|---|---|---|---|---|
| EP | 3000377 | B1 | | 8/2017 | |
| JP | 2001314693 | A | | 11/2001 | |
| JP | 4712679 | B2 | | 6/2011 | |
| JP | 2011167431 | A | * | 9/2011 | |
| JP | 6212716 | B2 | | 10/2017 | |
| KR | 101345228 | B1 | | 12/2013 | |
| KR | 20180097292 | A | * | 8/2018 | ........... A47L 15/486 |

OTHER PUBLICATIONS

Extended European Search Report in European Appln. No. 22853292.
5, mailed on Jun. 16, 2025, 9 pages.

\* cited by examiner

<u>80</u>

DISHWASHER

CROSS-REFERENCE TO RELATED APPLICATIONS

This application is a National Stage application under 35 U.S.C. § 371 of International Application No. PCT/KR2022/010154, filed on Jul. 12, 2022, which claims the benefit of Korean Application No. 10-2021-0102066, filed on Aug. 3, 2021. The disclosures of the prior application are incorporated by reference in their entirety.

TECHNICAL FIELD

The present disclosure relates to a dishwasher, and in particular, a dishwasher that can prevent damage to a drying air supply part or a base, caused by an external impact such as a vibration generated during a washing operation and a drop test and the like, prevent the drying air supply part from physically coming into direct contact with the base, and minimize an amount of heat transferred from the drying air supply part to the base.

Background Art

Dishwashers spray wash water such as water to a wash target such as a vessel, a cooking tool and the like that are stored in the dishwashers to wash the wash target. The wash water used for washing may include a detergent.

A dishwasher ordinarily includes a wash tub forming a wash space, a storage part accommodating a wash target in the wash tub, a spray arm spraying wash water to the storage part, and a sump storing water and supplying wash water to the spray arm.

A dishwasher helps to reduce time and efforts spent washing wash targets such as a vessel and the like after meals, enhancing user convenience.

Ordinarily, a dishwasher performs a washing procedure of washing a wash target, a rinsing procedure of rinsing the wash target, and a drying procedure of drying the wash target washed and rinsed.

In recent years, dishwashers supplying high-temperature drying air into the wash tub during the drying procedure to reduce drying time, and promoting the sterilization effect of a wash target have been launched.

In relation to this, EU Patent No. 3000377 (prior art document 001) provides a dishwasher provided with a hot air supply device generating and supplying high-temperature drying air after the washing and rinsing procedures are completed.

In the hot air supply device of prior art document 001, an air blowing fan module generating a drying air current, and a heater housing in which a heater heating drying air is built are disposed and fixed at a base.

For their installation and fixation at the base, the air blowing fan module and the heater housing are respectively provided with an additional tab-shaped fastening part for enabling the air blowing fan module and the heater housing to be fastened through a screw bolt as a fixation means.

The tab-shaped fastening part has a bolt hole through which the screw bolt passes, and in response, the base needs to be provided with a fastened part.

Accordingly, in the dishwasher of prior art document 001, an additional fastening part is provided at the hot air supply device, causing an increase in the volume of the hot air supply device and an increase in the man hours of manufacturing and manufacturing costs required for fastening with a screw bolt and the like.

Additionally, the dishwasher of prior art document 001 is provided with no additional damping means that can absorb an impact and vibrations between the fastening part and the base of the hot air supply device. As a result, it is highly likely that damage occurs between the fastening part of the hot air supply device and the fastened part of the base due to an external impact such as vibrations generated during the operation of the dishwasher and a drop test and the like.

Further, the dishwasher of prior art document 001 has a structure in which heat generated from the heater through the fastening part of the hot air supply device is transferred to the base. Thus, thermal damage such as at least partial deformation of the fastened part, made of a plastic material, of the base, caused by heat transferred from the hot air supply device, and the like, is highly likely to occur.

DESCRIPTION OF THE INVENTION

Technical Problems

The first objective of the present disclosure to provide a dishwasher in which a drying air supply part is supported on a base without an additional fastening means, to prevent an increase in the volume of a hot air supply device and reduce man hours in manufacturing and manufacturing costs.

The second objective of the present disclosure is to provide a dishwasher in which a drying air supply part is supported on a base through an elastic damper, to effectively prevent damage to the drying air supply part or the base, caused by an external impact such as a vibration generated during the operation of the dishwasher and a drop test and the like.

The third objective of the present disclosure is to provide a dishwasher in which a drying air supply part is directly supported on a base through an elastic damper to prevent the drying air supply part from physically coming into direct contact with the base and minimize an amount of heat transferred from the drying air supply part to the base.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

A dishwasher according to the present disclosure comprises a wash tub configured to have a wash space that accommodates a wash target and has an open front surface: a drying air supply part disposed at a lower side of the wash tub, and configured to generate high-temperature drying air for drying the wash target and supply the high-temperature drying air into the wash tub: a base disposed at a lower side of the drying air supply part; and a damper part disposed between the drying air supply part and the base, and configured to elastically support the drying air supply part against the base. Accordingly, the damage to the drying air supply part or the base may be effectively prevented, caused by an external impact such as a vibration generated during the operation of the dishwasher and a drop test and the like.

The drying air supply part and the base separate from each other with the damper part therebetween.

The damper part is made of an elastic material.

The drying air supply part comprises an air blowing fan configured to generate a drying air current that is supplied into the wash tub: a heater housing configured to have an air passage therein that is provided with an inlet through which the drying air current is drawn and an outlet through which the drying air current is discharged: heater disposed in the air passage at least partially, and configured to heat the air current: a first leg one end portion of which connects to a lower side of the inlet, and the other end portion of which extends toward the base; and a second leg one end portion of which connects a lower side of the outlet, and the other end portion of which extends toward the base, and a length of the heater housing, from the inlet formed at a front end side of the heater housing to the outlet formed at a rear end side of the heater housing, in a longitudinal direction may be greater than a length of the heater housing in a horizontal direction that is perpendicular to the longitudinal direction.

Each of the first leg and the second leg comprises a sheet-shaped perpendicular extension part one end portion of which connects to the heater housing and the other end portion of which extends toward the base, and a width of the perpendicular extension part in the horizontal direction may be greater than a thickness of the perpendicular extension part in the longitudinal direction.

Each of the first leg and the second leg may further comprise a sheet-shaped horizontal extension part disposed between one end portion and the other end portion of the perpendicular extension part and configured to extend in the longitudinal direction.

The damper part comprises a first damper part coupled to the other end portion of the first leg; and a second damper coupled to the other end portion of the second leg, and a horizontal extension part of the first leg may contact an upper surface of the first damper, and a horizontal extension part of the second leg may contact an upper surface of the second damper.

The first damper and the second damper may have the same exterior shape and the same size.

The first damper and the second damper may be coupled to the first leg and the second leg in such a way that the first damper and the second damper are compatible with each other.

The base may comprise a plurality of first support ribs arranged around the first damper; and a plurality of second support ribs arranged around the second damper.

The drying air supply part further comprises a connection duct part one end of which connects to the outlet of the heater housing, and the other end of which is fixed to the wash tub, and an up-down movement of a rear end side of the heater housing may be limited by the connection duct part and the second support rib.

The plurality of first support ribs may comprise a plurality of main ribs spaced in the horizontal direction with the first damper therebetween to support the first damper in the horizontal direction and a gravitational direction; and a plurality of sub ribs spaced in the longitudinal direction with the first damper therebetween to support the first damper in the longitudinal direction.

The plurality of sub ribs comprises a plurality of first sub ribs and a plurality of second sub ribs that are spaced from each other in the longitudinal direction, and the plurality of first sub ribs may be disposed farther from the connection duct part in the longitudinal direction than the plurality of second sub ribs, and the plurality of first sub ribs may stay in no contact with the first damper.

The plurality of second sub ribs may keep contacting the first damper.

Additionally, A projection part configured to protrude along the longitudinal direction is provided on an outer surface of the first damper, and a width of the projection part in the horizontal direction may be greater than a distance between the plurality of first sub ribs in the horizontal direction and less than a distance between the plurality of second sub ribs in the horizontal direction.

The projection part may protrude between the plurality of second sub ribs.

The plurality of second support ribs may comprise a plurality of main ribs spaced in the horizontal direction with the second damper therebetween to support the second damper in the horizontal direction and the gravitational direction; and a plurality of sub ribs spaced in the longitudinal direction with the second damper therebetween to support the second damper in the longitudinal direction.

The plurality of sub ribs comprises a plurality of first sub ribs and a plurality of second sub ribs that are spaced from each other in the longitudinal direction, and each of the plurality of first sub ribs and the plurality of second sub ribs may keep contacting the second damper.

Further, a projection part configured to protrude along the longitudinal direction is provided on an outer surface of the second damper, and a width of the projection part in the horizontal direction may be greater than a distance between the plurality of first sub ribs in the horizontal direction and less than a distance between the plurality of second sub ribs in the horizontal direction.

The projection part may be disposed between the plurality of second sub ribs.

Advantageous Effects

The dishwasher according to the present disclosure may prevent an increase in the volume of a hot air supply device and reduce man hours in manufacturing and manufacturing costs.

The dishwasher according to the present disclosure may effectively prevent damage to the drying air supply part or the base, caused by an external impact such as a vibration generated during the operation of the dishwasher and a drop test and the like.

The dishwasher according to the present disclosure may prevent the drying air supply part from physically coming into direct contact with the base and minimize an amount of heat transferred from the drying air supply part to the base.

Specific effects are described along with the above-described effects in the section of detailed description.

DETAILED DESCRIPTION OF EXEMPLARY EMBODIMENTS

Figure 1:
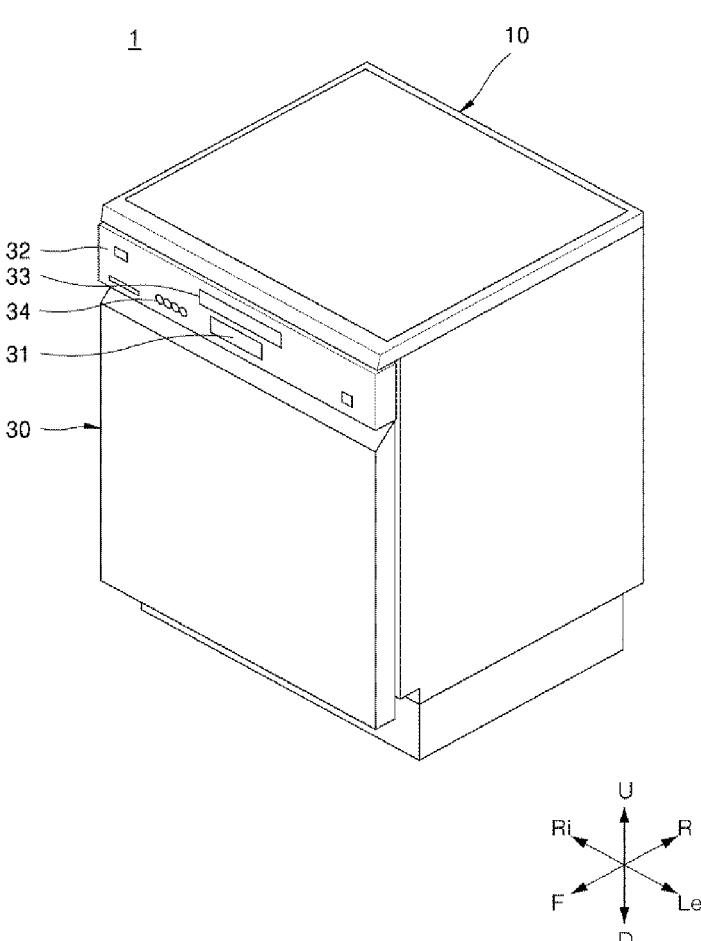
FIG. 1 is a front perspective view of a dishwasher of one embodiment.

The above-described aspects, features and advantages are specifically described hereinafter with reference to accompanying drawings such that one having ordinary skill in the art to which the subject matter of the present disclosure pertains can embody the technical spirit of the disclosure easily. In the disclosure, detailed description of known technologies in relation to the subject matter of the disclosure is omitted if it is deemed to make the gist of the disclosure unnecessarily vague. Hereinafter, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components are not to be limited by the terms. Certainly, a first component can be a second component, unless stated to the contrary.

Throughout the disclosure, each component can be provided as a single one or a plurality of ones, unless stated to the contrary.

When any one component is described as being "in the upper portion (or the lower portion)" or "on (or under)" another component, any one component can be directly on (or under) another component, and an additional component can be interposed between the two components.

When any one component is described as being "connected", "coupled" or "connected" to another component, any one component can be directly connected or coupled to another component, but an additional component can be "interposed" between the two components or the two components can be "connected", "coupled" or "connected" by an additional component.

In the disclosure, singular forms include plural forms as well, unless explicitly indicated otherwise. In the disclosure, the terms "comprised of", "comprise", and the like do not imply necessarily including stated components or stated steps and imply excluding some of the stated components or stated steps or including additional components or additional steps.

In the disclosure, singular forms include plural forms as well, unless explicitly indicated otherwise. In the disclosure, the terms "comprised of", "comprise", and the like do not imply necessarily including stated components or stated steps and imply excluding some of the stated components or stated steps or including additional components or additional steps.

Throughout the disclosure, the terms "A and/or B" as used herein can denote A, B or A and B, and the terms "C to D" can denote C or greater and D or less, unless stated to the contrary.

Hereinafter, the subject matter of the present disclosure is described with reference to drawings in which the configuration of a dishwasher 1 of the embodiment is illustrated.

[Entire Structure of Dishwasher]

Hereinafter, the entire structure of the dishwasher of one embodiment is specifically described with reference to the accompanying drawings.

Figure 2:
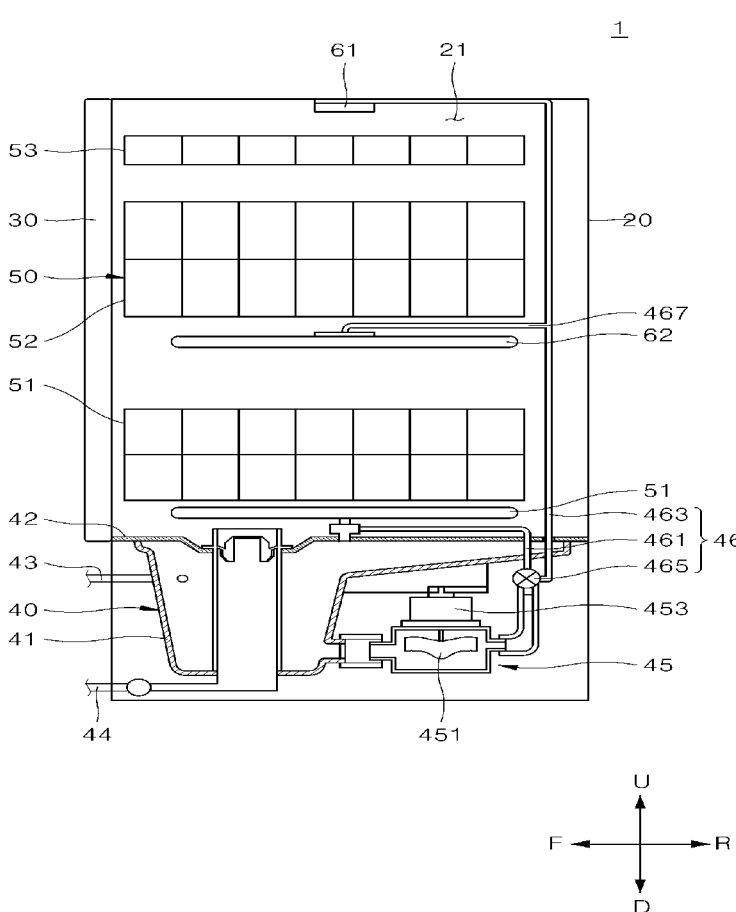
FIG. 2 is a schematic cross-sectional view of the dishwasher of FIG. 1.

FIG. 1 is a front perspective view of a dishwasher according to the present disclosure, and FIG. 2 is a sche-matic cross-sectional view of the inner structure of the dishwasher according to the present disclosure.

As illustrated in FIGS. 1 to 2, the dishwasher 1 according to the present disclosure comprises a case 10 that forms the exterior of the dishwasher 1, a wash tub 20 that is installed in the case 10, forms a wash space 21 in which a wash target is washed, and has an open front surface, a door 30 that opens and closes the open front surface of the wash tub 20, a driving part 40 that is disposed in the lower portion of the wash tub 20 and supplies, collects, circulates and drains wash water for washing a wash target, a storage part 50 that is detachably provided in the wash space 21 in the wash tub 20 and on which a wash target is mounted, and a spray part 60 that is installed near the storage part 50 and sprays wash water for washing a wash target.

A wash target mounted on the storage part 50 may be vessels such as a bowl, a dish, a spoon, chopsticks and the like, and other cooking tools, for example. Hereinafter, the wash target may be referred to as a vessel, unless stated otherwise.

The wash tub 20 may be shaped into a box the front surface of which is open entirely, and be a so-called tub.

The wash space 21 may be formed in the wash tub 20, and its open front surface may be opened and closed by the door 30.

The wash tub 20 may be formed in such a way that a metal sheet having high resistance of high-temperature and moisture, e.g., a sheet made of stainless steel, is pressed.

Additionally, a plurality of brackets may be disposed on the inner surface of the wash tub 20, to allow functional components such as the storage part 50, the spray part 60 and the like that are described hereinafter to be supported and installed in the wash tub 20.

Additionally, the driving part 40 may comprise a sump 41 that stores wash water, a sump cover 42 that distinguishes the sump 41 from the wash tub 20, a water supply part 43 that supplies wash water to the sump 41 from the outside, a drain part 44 that discharges the wash water of the sump 41 to the outside, and a water supply pump 45 and a supply flow path 46 that are used to supply the wash water of the sump 41 to the spray part 60.

The sump cover 42 may be disposed at the upper side of the sump 41 and distinguish the wash tub 20 from the sump 41. Further, the sump cover 42 may be provided with a plurality of return holes for returning wash water, spraying to the wash space 21 through the spray part 60, to the sump 41.

That is, wash water sprayed toward a vessel from the spray part 60 may fall to the lower portion of the wash space 21, and return to the sump 42 again through the sump cover 42.

The water supply pump 45 may be provided in a lateral portion or the lower portion of the sump 41, and pressurize wash water to supply the wash water to the spray part 60.

One end of the water supply pump 45 may connect to the sump 41, and the other end may connect to the supply flow path 46. An impeller 452 and a motor 453 and the like may be provided in the water supply pump 45. As electric power is supplied to the motor 453, the impeller 451 may rotate, and the wash water of the sump 41 may be pressurized and then supplied to the spray part 60 through the supply flow path 46.

Further, the supply flow path 46 may selectively supply wash water supplied from the water supply pump 45 to the spray part 60.

For example, the supply flow path 46 may comprise a first supply flow path 461 that connects to a lower spray arm 61, and a second supply flow path 463 that connects to an upper spray arm 62 and a top nozzle 63, and be provided with a supply flow path diverter valve 465 that selectively opens and closes supply flow paths 461, 463.

The supply flow path diverter valve 465 may control each of the supply flow paths 461, 463 such that each of the supply flow paths 461, 463 is opened consecutively or simultaneously.

Additionally, the spray part 60 is provided to spray wash water to a vessel and the like stored in the storage part 50.

Specifically, the spray part 60 may comprise the lower spray arm 61 that is disposed in the lower portion of the wash tub 20 and sprays wash water to a lower rack 51, the upper spray arm 62 that is disposed between the lower rack 51 and an upper rack 52 and sprays wash water to the lower rack 51 and the upper rack 52, and the top nozzle 63 that is disposed in the upper portion of the wash tub 20 and sprays wash water to a top rack 53 or the upper rack 52.

In particular, the lower spray arm 61 and the upper spray arm 62 may be provided in the wash space 21 of the wash tub 20, and spray wash water toward a vessel of the storage part 50 while the lower spray arm 61 and the upper spray arm 62 rotate.

The lower spray arm 61 may be rotatably supported at the upper side of the sump cover 42 such that the lower spray arm 61 sprays wash water toward the lower rack 51 while rotating under the lower rack 51.

Additionally, the upper spray arm 62 may be rotatably supported by a spray arm holder 467 such that the upper spray arm 62 sprays wash water while the upper spray arm 62 rotates between the lower rack 51 and the upper rack 52.

Further, to enhance washing efficiency, a reflective plate diverting the direction of wash water sprayed from the lower spray arm 61 to an upward direction (U-direction) may be further provided on a lower surface 25 of the wash tub 20.

A detailed configuration of the spray part 60 may adopt a configuration that is already known in the art. Hereinafter, description of a detailed configuration of the spray part 60 is omitted.

Further, the storage part 50 for storing a vessel may be provided in the wash space 21.

The storage part 50 may be provided in such a way that the storage part 50 is drawn through the open front surface od the wash tub 20 from the inside of the wash tub 20.

For example, FIG. 2 shows an embodiment provided with a storage part that comprises the lower rack 51 which is disposed in the lower portion of the wash tub 20 and stores a relatively large vessel, the upper rack 52 which is disposed at the upper side of the lower rack 51 and stores a medium-sized vessel, and the top rack 53 which is disposed in the upper portion of the wash tub 20 and stores a small vessel and the like. The number of the storage parts 50 is not limited in the present disclosure, but as illustrated, a dishwasher of an embodiment provided with three storage parts 50 is described.

Each of the lower rack 51, the upper rack 53 and the top rack 53 may be drawn to the outside by passing through the open front surface of the wash tub 20.

To this end, a guide rail 54 may be provided on both lateral walls of the wash tub 20 forming the inner circumferential surface of the wash tub 20, and for example, the guide rail 54 may comprise an upper rail 541, a lower rail 542 and a top rail 543.

Wheels may be provided respectively under the lower rack 51, the upper rack 53 and the top rack 53. The user may draw the lower rack 51, the upper rack 53 and the top rack 53 to the outside through the front surface of the wash tub

20, to store a vessel on the racks or take a vessel from the racks after the vessel is washed.

The guide rail 54 may be provided as a fixed guide rail that is shaped into a simple rail for guiding the withdrawal and insertion of the spray part 60 or a stretchable guide rail that guides the withdrawal and storage of the spray part 60 and the withdrawal distance of which increases as the spray part 60 is drawn.

Additionally, the door 30 is used to open and close the open front surface of the wash tub 20 described above.

A hinge part (not illustrated) for opening and closing the door 30 is provided in the lower portion of the front surface of the wash tub 20, which is ordinarily open, and the door 30 is opened with respect to the hinge part as a rotation axis.

A handle 31 for opening the door 30 and a control panel 32 for controlling the dishwasher 1 may be provided on the outer surface of the door 30.

As illustrated, the control panel 32 may be provided with a display 33 that visually displays information on a current operation state and the like of the dishwasher, and a button part 34 that comprises a selection button to which the user's selection manipulation is input, and a power button to which the user's manipulation for turning on-off of the power of the dishwasher is input, and the like.

Further, the inner surface of the door 30 forms a mounting surface on which the lower rack 51 of the storage part 50 is supported as the door 30 is opened, while forming one surface of the washtub 20 as the door 30 is closed.

To this end, in the case where the door 30 is fully opened, the inner surface of the door 30 preferably forms a horizontal surface in a direction the same as the direction in which the guiderail 54 guiding the lower rack 51 extends.

Though not illustrated, a drying air supply part for generating high-temperature drying air and supplying the high-temperature drying air into the wash tub 20 may be provided in the lower portion of the wash tub 20. At least one drying air supply hole through which the high-temperature drying air generated by the drying air supply part is drawn into the wash tub may be provided at the wash tub 20.

[Detailed Configuration of Drying Air Supply Part]

Hereinafter, a detailed configuration of the drying air supply part 80 described above is described with reference to FIGS. 3 to 7.

Figure 3:
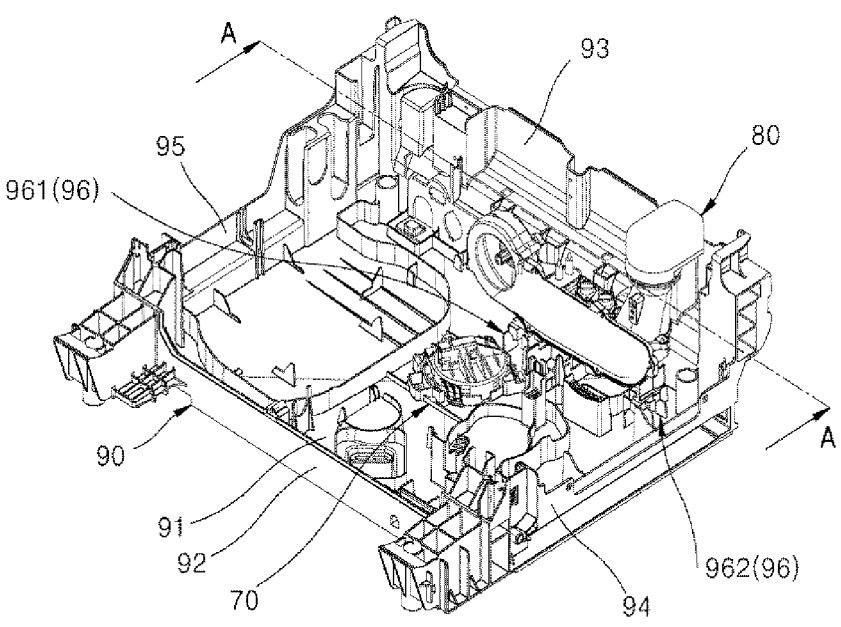
FIG. 3 is a front perspective view of a state in which a drying air supply part of the dishwasher of one embodiment is accommodated in a base.
Figure 3:
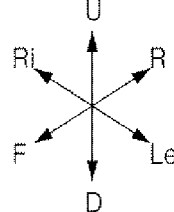

As illustrated in FIG. 3, the drying air supply part 80 may be disposed in such a way that the drying air supply part 80 is accommodated in the base 90 and supported by a bottom surface 91 of the base 90.

For example, the drying air supply part 80 may be disposed at a position near a rear surface 93 of the base 90, and disposed to be approximately parallel with the rear surface 93 of the base 90, at a position between a leakage sensing part 70 and the rear surface 93 of the base 90.

The position at which the drying air supply part is disposed may be selected considering the characteristics of the drying air supply part 80 that generates high-temperature heat of 100° C. or greater in a high-temperature drying air supply mode. That is, the drying air supply part may be disposed at a position where the drying air supply part avoids electronic components that are greatly affected by high-temperature heat.

Additionally, the position at which the drying air supply part is disposed may be selected considering the position of the drying air supply hole formed on the lower surface of the wash tub 20. That is, to ensure user safety, the drying air supply hole through which drying air is drawn may be formed at the corner of the lower surface of the wash tub 20, which is adjacent to the rear surface and the left surface of the wash tub 20.

To effectively generate drying air and supply the drying air to the drying air supply hole formed at the above-described position, the drying air supply part 80 may be disposed at the lower side of the drying air supply hole.

However, the position at which the drying air supply part 80 is disposed is described as an example, and the drying air supply part may be disposed at a position near the left surface 94, a right surface 95 or a front surface 92 of the base 90, rather than the rear surface 93 of the base 90. The position of the drying air supply part 80 is not limited, but hereinafter, the position of the drying air supply part 80, which is parallel with the rear surface 93 of the base 90, near the rear surface 93 of the base 90, is described.

Figure 4:
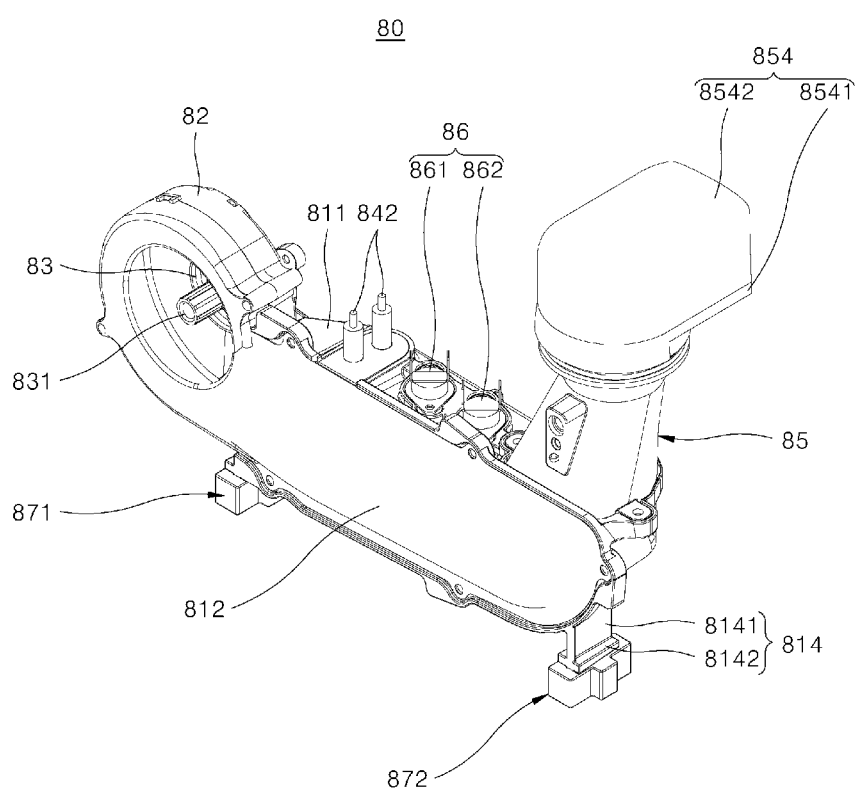
FIG. 4 is a front perspective view of the drying air supply part of FIG. 3.
Figure 5:
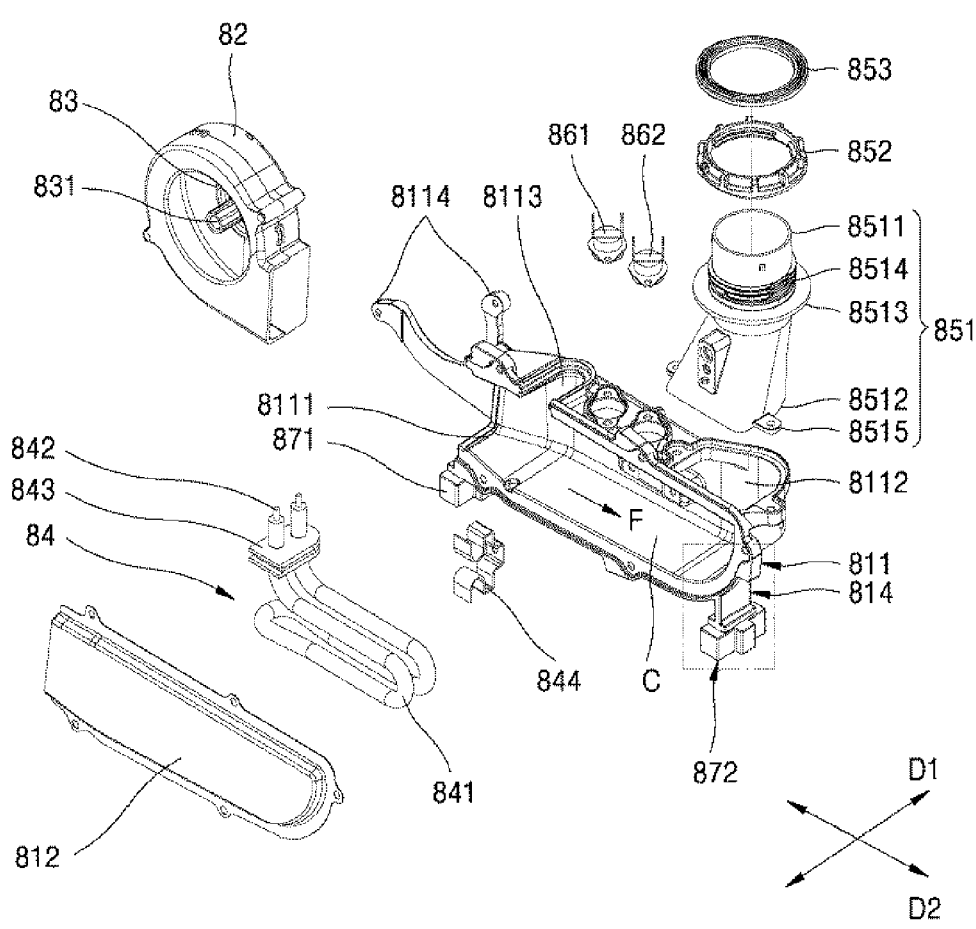
FIG. 5 is an exploded perspective view of FIG. 4.
Figure 6:
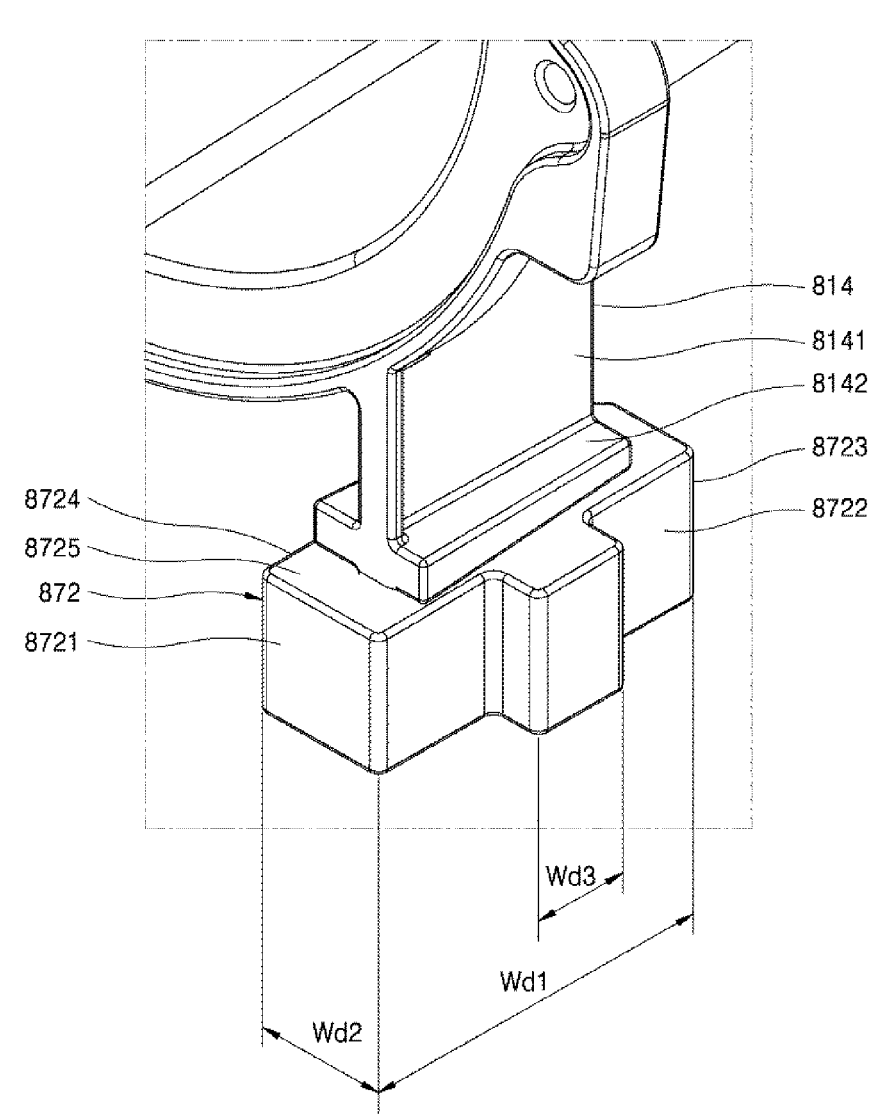
FIG. 6 is a partially enlarged view of FIG. 4.
Figure 7:
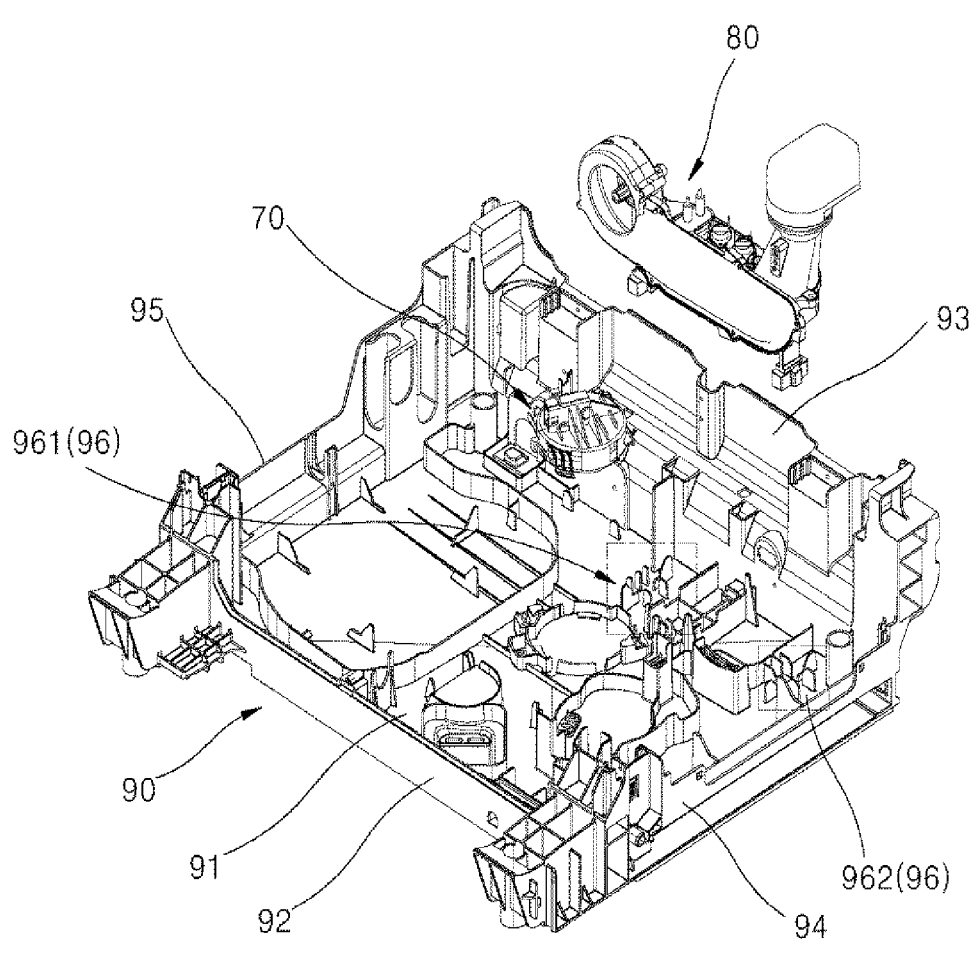
FIG. 7 is a front perspective view of a state in which the drying air supply part of FIG. 3 separates from the base.

FIGS. 4 to 6 show a detailed configuration of the drying air supply part 80.

As illustrated, the drying air supply part 80 generating drying air and supplying the drying air into the wash tub 20 may comprise an air blowing fan generating a drying air current F that is supplied into the wash tub 20, an air blowing motor 83 generating a rotation driving force of the air blowing fan, a heater 84 heating drying air, and a heater housing 81 having an air passage C therein.

The air blowing fan is disposed at an upper stream side in the direction of the drying air current F, at an inlet 8111 side of the heater housing 81, and accelerates air to the air passage C formed in the heater housing 81 and generates the drying air current F.

The air blowing motor 83 generating a rotation driving force of the air blowing fan may be modularized on the air blowing fan, and accommodated in the fan housing 82.

The type of air blowing fan applied to the drying air supply part 80 is not limited, and for example, a sirocco fan is preferable considering constraints of the position and space where the air blowing fan is installed.

In the case where a sirocco fan is applied as illustrated in the embodiment, external sir is suctioned from the center of the sirocco fan, in a direction parallel with a rotation shaft 831, and the air may be accelerated and discharged toward the outside in a radial direction. The air accelerated and discharged may be drawn into the air passage C in the heater housing 81 through the fan housing 82 and the inlet 8111 of the heater housing 81 while forming the drying air current F.

The fan housing 82, as illustrated, may be fixed to a connection tab 8114 provided at the heater housing 81 through a fastening means such as a screw bolt and the like that are not illustrated, for example.

The heater 84 may be disposed in the air passage C of the heater housing 81, and preferably, be exposed directly to the drying air current F and heat the drying air current F, in the air passage C.

In the case where the drying air supply part 80 supplies high-temperature drying air, power may be supplied to the heater 84 to heat drying air, and in the case where the drying air supply part 80 supplies low-temperature drying air, the supply of power to the heater 84 may be cut off to stop the heater 84 from operating.

In the case where the low-temperature drying air is supplied, the air blowing motor 83 may keep operating to generate a dying air current F.

The type of the heater 84 provided at the drying air supply part 80 of one embodiment is not limited, but a tube-shaped sheath heater having a relatively simple structure and excellent heat generation efficiency may be selected as the heater 84, for example.

To enhance heat exchange efficiency, a heater main body 841 may have a three-dimensional shape that bends a plurality of times to ensure a heat transfer surface area, while being directly exposed to the drying air current F in the air passage C in the heater housing 81.

One end portion and the other end portion of the heater main body 841 may extend upward by penetrating the upper surface of the heater housing 81.

Additionally, a pair of terminals 842 for receiving power may be formed in one end portion and the other end portion of the heater main body 841.

As illustrated, the pair of terminals 842 may be installed at and fixed to the housing through a terminal fixation part 843. A fixation slot 8113 may be provided on the upper surface of the heater housing 81 such that the terminal fixation part 843 is coupled to the fixation slot 8113 in a sliding manner.

Additionally, a main body support part 844 for firmly supporting the heater main body 841 on the air passage C may be disposed in the heater housing 81. As illustrated in FIG. 5, the main body support part 844 may be formed in such a way that a metal sheet is pressed, to have a shape corresponding to the shape of the outer surface of the tube-shaped heater main body 841.

Further, as illustrated in FIGS. 4 and 5, a temperature sensor as a temperature sensing part 86 that senses the temperature of high-temperature drying air generated through the heater 84 or senses whether the heater 84 overheats may be provided on the upper surface of the housing main body 811 of the heater housing 81.

For example, the temperature sensor may comprise a thermistor 861 sensing the temperature of drying air, and a thermostat 862 sensing whether the heater 84 overheats.

An output signal of the temperature sensor may be delivered to a controller that is not illustrated, and the controller may receive the output signal of the temperature sensor to determine the temperature of high-temperature drying air and whether overheating occurs. At a time when overheating occurs, the controller may change the operation mode of the drying air supply part 80 from a high-temperature drying air supply mode to a low-temperature drying air supply mode by cutting off the supply of power to the heater 84.

Further, the heater housing 81 comprises a housing main body 811 that has the air passage C provided with an inlet 8111 and an outlet 8112 therein.

The heater housing 81 may be shaped into an approximate hexahedron box having an air passage C therein.

Specifically, the length of the heater housing 81 in the longitudinal direction D2 from the inlet 8111 formed at the front end side of the heater housing 81 to the outlet 8112 formed at the rear end side of the heater housing 81, with respect to the direction in which a drying air current flows, may be greater than the length of the heater housing 81 in the horizontal direction D1 perpendicular to the longitudinal direction D2.

Accordingly, a maximum length of the air passage C is ensured with respect to the direction in which the drying air current flows, such that efficiency of heat exchange of the drying air with the heater 84 disposed in the heater housing 81 improves.

In the illustrated embodiment, the front surface and the right surface of the heater housing 81 are open entirely.

The rear surface of the heater housing, which is a front end with respect to the direction in which the drying air current flows, is open entirely and forms the inlet 8111 of the air passage C, and fluid-connects to the fan housing 82 described above.

A housing cover 812 may be coupled to the open front surface of the heater housing 81, such that the front surface of the heater housing 81 is closed.

The outlet 8112 of the air passage C may be formed at the rear end side of the heater housing with respect to the direction in which the drying air current flows. For example, the outlet 8112 may be formed on the upper surface of the housing main body 811, near the rear end side of the housing main body 811.

As described above, the heater 84 generating high-temperature heat is accommodated in the housing main body 811. Accordingly, the housing main body 811 may be made of a material appropriate for an environment of high temperature generated through the heater 84 accommodated in the housing main body 811, preferably, made of a lightweight metallic material.

Further, the drying air supply part 80 may further comprise a connection duct part 85 that is coupled to the outlet 8112 side of the heater housing 81 and has an air passage therein.

As described above, the heater housing 81 and the air blowing fan are disposed at the lower side of the lower surface of the wash tub 20. The connection duct part 85 guides drying air discharged from the heater housing 81 to a predetermined position, i.e., guide drying air such that the drying air moves toward the drying air supply hole.

For example, the predetermined position may be the lower surface of the wash tub 20, and the drying air supply hole through which a drying air current F guided to the connection duct part 85 is drawn may be formed at the corner of the lower surface of the wash tub 20, near the rear surface and the left surface of the wash tub 20.

A duct main body 851 of the connection duct part 85, as illustrated in the embodiment, may be formed in such a way that the duct main body 851 connects the drying air supply hole of the wash tub 20 and the outlet 8112 of the heater housing 81.

For example, a lower end portion 8512 of the duct main body 851 of the connection duct part 85 may communicate with the outlet 8112 of the heater housing 81, and an upper end portion 8511 may be shaped into a cylinder that extends in a perpendicular direction and connects to the drying air supply hole.

A fastening tab 8515 for fastening and fixation to the heater housing 81 may be provided at a plurality of points of the lower end portion 8512 of the duct main body 851.

Additionally, considering the shape of the outlet 8112 of the heater housing 81, the lower end portion 8512 of the duct main body 851 may be shaped into a rectangular box, and to prevent leakage, the upper end portion 8511 of the duct main body 851 may be shaped into a cylinder. That is, the duct main body 851 may be shaped into a cylinder, to enhance efficiency of fastening and prevent leakage between the upper end portion 8511 of the duct main body 851 and the drying air supply hole of the wash tub 20.

As a means of enhancing fastening efficiency and preventing leakage, a ring-shaped flange 8513 and a male screw part 8514 may be provided at the upper end portion 8511 side of the duct main body 851.

The upper end portion 8511 of the duct main body 851 may extend in the upward direction (U-direction) by penetrating the lower surface of the wash tub 20, and the upper end portion 8511 of the duct main body 851 and the male screw part 8514 may protrude toward the inner portion of the wash tub 20 by passing through the lower surface of the wash tub 20 at least partially.

A fastening nut 852 is coupled to the male screw part 8514 disposed by passing through the inner portion of the wash tub 20.

At a time of fixation and fastening of the duct main body 851, the fastening nut 852 is screw-coupled to the male screw part 8514, in the wash tub 20, such that the upper end portion 8511 of the duct main body 851 is fixed in the state of being exposed to the inner portion of the wash tub 20.

That is, the fastening nut 852 closely contacts the upper side of the lower surface of the wash tub 20, and in the state where the ring-shaped flange 8513 closely contacts the lower side of the lower surface of the wash tub 20, the flange 8513 receives a force of being pulled toward the lower surface of the wash tub 20 because of a coupling force of the fastening nut 852. Accordingly, an adhesive force between the flange 8513 and the lower surface of the wash tub 20 increases. Thus, wash water is much less likely to leak through the outer surface of the duct main body 851. As a means of improving leakage prevention of wash water, an airtight ring 853 made of an elastic material may be additionally provided between the flange 8513 and the lower surface of the wash tub 20.

Additionally, the connection duct part 85 fixes the heater housing 81 as well as guiding a drying air current.

That is, as the upper end portion 8511 of the duct main body 851 is fixed to the wash tub 20 through the fastening nut 852, an up-down movement of the rear end side of the heater housing 81 is limited and the heater housing 81 may be fixed by the duct main body 851.

Accordingly, without an additional fastening means, a support structure with respect to the upper side of the drying air supply part 80 may be achieved.

A support structure with respect to the lower side of the drying air supply part 80 may be achieved through a damper and a support rib 96 of the base 90, as described hereinafter.

Further, the drying air supply part 80 of one embodiment may further comprise an air current guide 854 that changes a direction of drying air supplied through the duct main body 851.

As illustrated in FIGS. 3 and 4, the air current guide 854 may comprise a lower guide 8541 that is fitted and coupled to the upper end portion 8511 of the duct main body 851, and an upper guide 8542 that is coupled to the upper side of the lower guide 8541.

A flow path diverting structure in which a direction of a drying air current changes may be formed between the lower guide 8541 and the upper guide 8542.

Further, the drying air supply part 80 of the dishwasher 1 of one embodiment may further comprise a plurality of legs for keeping the heater housing 81 spaced from the bottom surface 91 of the base 90 in the upward direction.

Since the plurality of legs spaces the heater housing 81 having a high temperature apart from the base 90, such that heat directly conducted to the base 90 through the heater housing 81 is minimized.

As illustrated, the plurality of legs may comprise a first leg 813 one end portion of which connects to the lower side of the inlet 8111 of the heater housing 81 and the other end portion of which extends toward the bottom surface 91 of the base 90, and a second leg 814 one end portion of which connects to the lower side of the outlet 8112 of the heater housing 81 and the other end portion of which extends toward the bottom surface 91 of the base 90.

Since the length of the heater housing 81 in the longitudinal direction D2 is much greater than the length of the heater housing 81 in the horizontal direction D1 as described above, the first leg 813 and the second leg 814 may be disposed in the state of being spaced the farthest apart from each other along the longitudinal direction D2, such that the heater housing 81 is supported effectively.

For the first leg 813 and the second leg 814 to be spaced the farthest apart from each other, one end portion of a perpendicular extension part 8131 of the first leg 813 may be fixed to the lower side of the inlet 8111 of the heater housing 81, and one end portion of a perpendicular extension part of the second leg 814 may be fixed to the lower side of the outlet 8112 of the heater housing 81, based on a method such as a welding and the like.

Like the heater housing 81, the first leg 813 and the second leg 814 may be made of a lightweight metallic material appropriate for a high-temperature environment, and preferably, may be provided in the form of a sheet that has a horizontal D1 width greater than a longitudinal D2 thickness.

Since the first leg 813 and the second leg 814 are shaped into a sheet having the horizontal D1 width greater than the longitudinal D2 thickness, a support surface area in the horizontal direction is expanded such that heat of the heater housing 81 is not transferred in the horizontal direction D1 while a transfer of heat from the heater housing 81 is minimized.

Additionally, the first leg 813 and the second leg 814 may be respectively disposed between one end portion and the other end portion of the perpendicular extension part 8131, 8141 and may further comprise a sheet-shaped horizontal extension part 8132, 8142 extending in the longitudinal direction D2.

The horizontal extension part 8132, 8142 is to disperse a load of the drying air supply part 80 and transfer the dispersed load to a damper described hereinafter, by expanding a contact surface area with respect to the damper. As illustrated in FIG. 6, the bottom surface of the horizontal extension part 8132, 8142 directly surface-contacts an upper surface 8715, 8725 of the damper.

Like the perpendicular extension part 8131, 8141, the horizontal extension part 8132, 8142 may be made of a lightweight metallic material appropriate for a high-temperature environment.

FIG. 6 shows that the horizontal extension part 8132, 8142 is integrally formed at the perpendicular extension part 8131, 8141, for example, but the horizontal extension part 8132, 8142 may be manufactured apart from the perpendicular extension part 8131, 8141 and fixed between one end portion and the other end portion of the perpendicular extension part 8131, 8141.

Additionally, the drying air supply part 80 of the dishwasher 1 of one embodiment may be disposed between the heater housing 81 and the bottom surface 91 of the base 90, and further comprise a damper part elastically supporting the heater housing 81 against the base 90.

The damper part may serve as a sort of suspension that absorbs a vibration or an external impact generating during the operation of the dishwasher 1 and prevents damage to the drying air supply part 80 and the base 90.

Further, the damper part also serves as a sort of thermal insulation material that minimizes a transfer of high-temperature heat generated from the heater housing 81 o the base 90 through the first leg 813 and the second leg 814.

To this end, the damper part may be shaped into a block having an elastic material such as natural rubber or synthetic rubber and the like.

Specifically, the damper part may comprise a first damper 871 coupled to the other end portion of the perpendicular extension part 8131 of the first leg 813, and a second damper 872 coupled to the other end portion of the perpendicular extension part of the second leg 814.

Each of the first leg 813 and the second leg 814 may be elastically supported against the base 90 in an up-down direction through the first damper 871 and the second damper 872, and physically stays in no contact against the base 90.

That is, the heater housing 81 and the base 90 may remain separated from each other, with the first damper 871 and the second damper 872 therebetween.

Further, the first damper 871 and the second damper 872 have the same exterior shape and the same size. That is, the first damper 871 and the second damper 872 may be coupled to the first leg 813 and the second leg 814 in such a way that the first damper 871 and the second damper 872 are compatible with each other. Accordingly, manufacturing and design costs incurred for the damper part may decrease.

The first damper 871 and the second damper 872 may be respectively coupled in such a way that a portion of the perpendicular extension part 8131, 8141 of the first leg 813 and the second leg 814 simply passes through the upper surface 8715, 8725 of the first damper and the second damper and is inserted thereinto.

FIG. 6 shows that the other end portion of the perpendicular extension part of the second leg 814 penetrates the upper surface 8725 of the second damper 872 and is inserted thereinto, but in the same way, the first damper 871 may be coupled to the other end portion of the perpendicular extension part 8131 of the first leg 813.

At this time, to prevent the first leg 813 and the second leg 814 from contacting the bottom surface 91 of the base 90 directly, the other end portion of the perpendicular extension part 8131, 8141 of the first leg 813 and the second leg 814 are formed respectively not to pass through the lower surface 8716, 8726 of the first damper 871 and the second damper 872. That is, the other end portion of the perpendicular extension part 8131, 8141 of each of the first leg 813 and the second leg 814 may be preferably formed to be accommodated in the first damper 871 and the second damper 872.

Further, as illustrated, the widths Wd1 of the first damper 871 and the second damper 872 in the horizontal direction D1 may be greater than the widths of the perpendicular extension parts 8131, 8141 of the first leg 813 and the second leg 814 in the horizontal direction D1, to support the first leg 813 and the second leg 814 effectively.

For the same reason, the widths Wd1 of the first damper 871 and the second damper 872 in the horizontal direction D1 may be greater than the widths of the horizontal extension parts 8132, 8142 of the first leg 813 and the second leg 814 in the horizontal direction D1.

Additionally, the widths Wd2 of the first damper 871 and the second damper 872 in the longitudinal direction D2 may be greater than or the same as the widths of the horizontal extension parts 8132, 8142 of the first leg 813 and the second leg 814 in the longitudinal direction D2.

Further, as illustrated, a projection part 8717, 8727 may be provided on the outer surfaces of the first damper 871 and the second damper 872 and formed to protrude along the longitudinal direction D2.

The projection part 8717, 8727 prevents the drying air supply part 80 from be misassembled, based on an interaction with a support rib 96 described hereinafter. That is, in the state illustrated in FIG. 6, the projection part 8727 can be installed at the base 90 in the state where the projection part 8727 is formed on a second lateral surface 8722 of the second damper 872, but cannot be installed in other states. A detailed configuration of the projection part is described hereinafter, with reference to FIGS. 11 and 12.

As described above, the drying air supply part 80 may be accommodated in the base 90, and disposed to be supported by the bottom surface 91 of he base 90.

As a means of supporting the drying air supply part 80 in the right position, a plurality of support rubs 96 may be provided on the bottom surface 91 of the base 90.

Specifically, the plurality of support ribs 96 may comprise a plurality of first support ribs 961 arranged around the first damper 871 to support the first damper 871, and a plurality of second support ribs 962 arranged around the second damper 872 to support the second damper 872.

Figure 8:
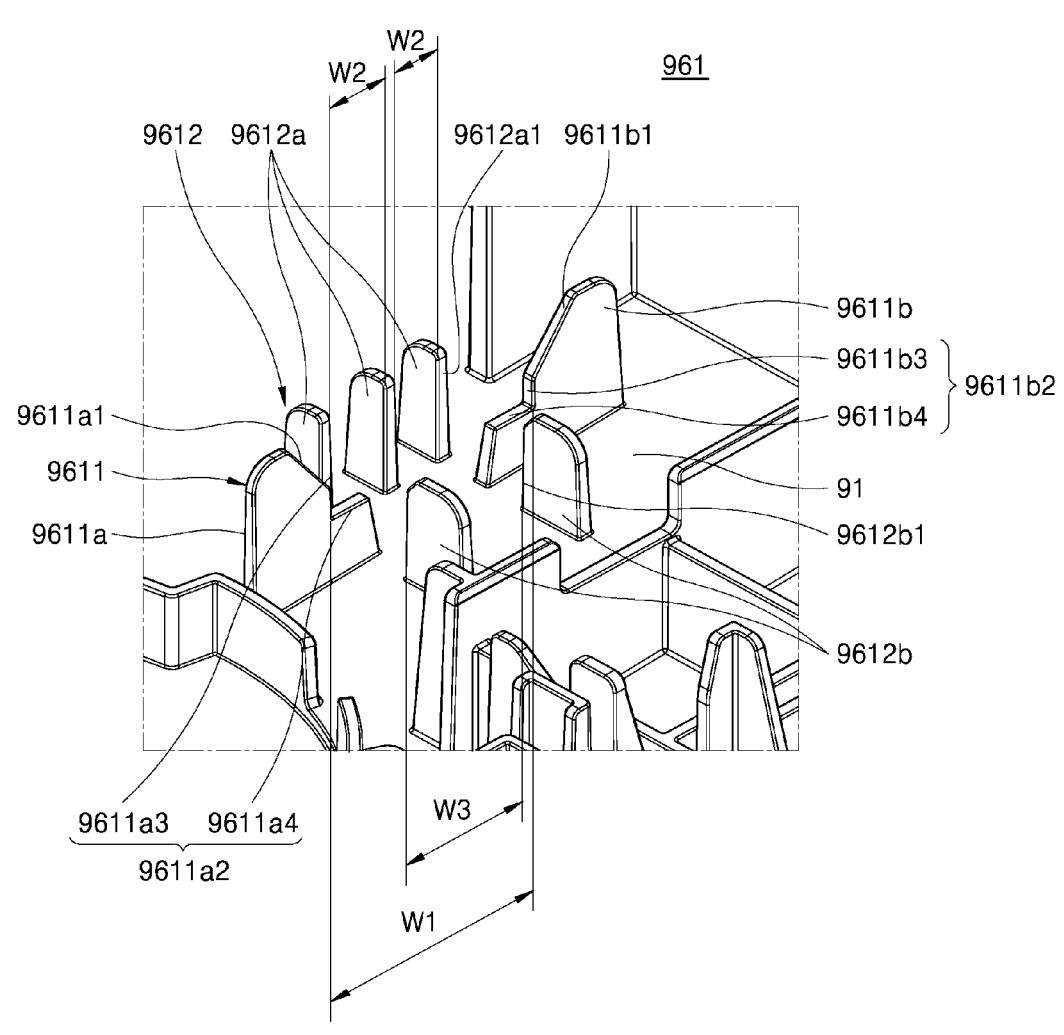
FIGS. 8 and 9 is partially enlarged views of FIG. 7.
Figure 11:
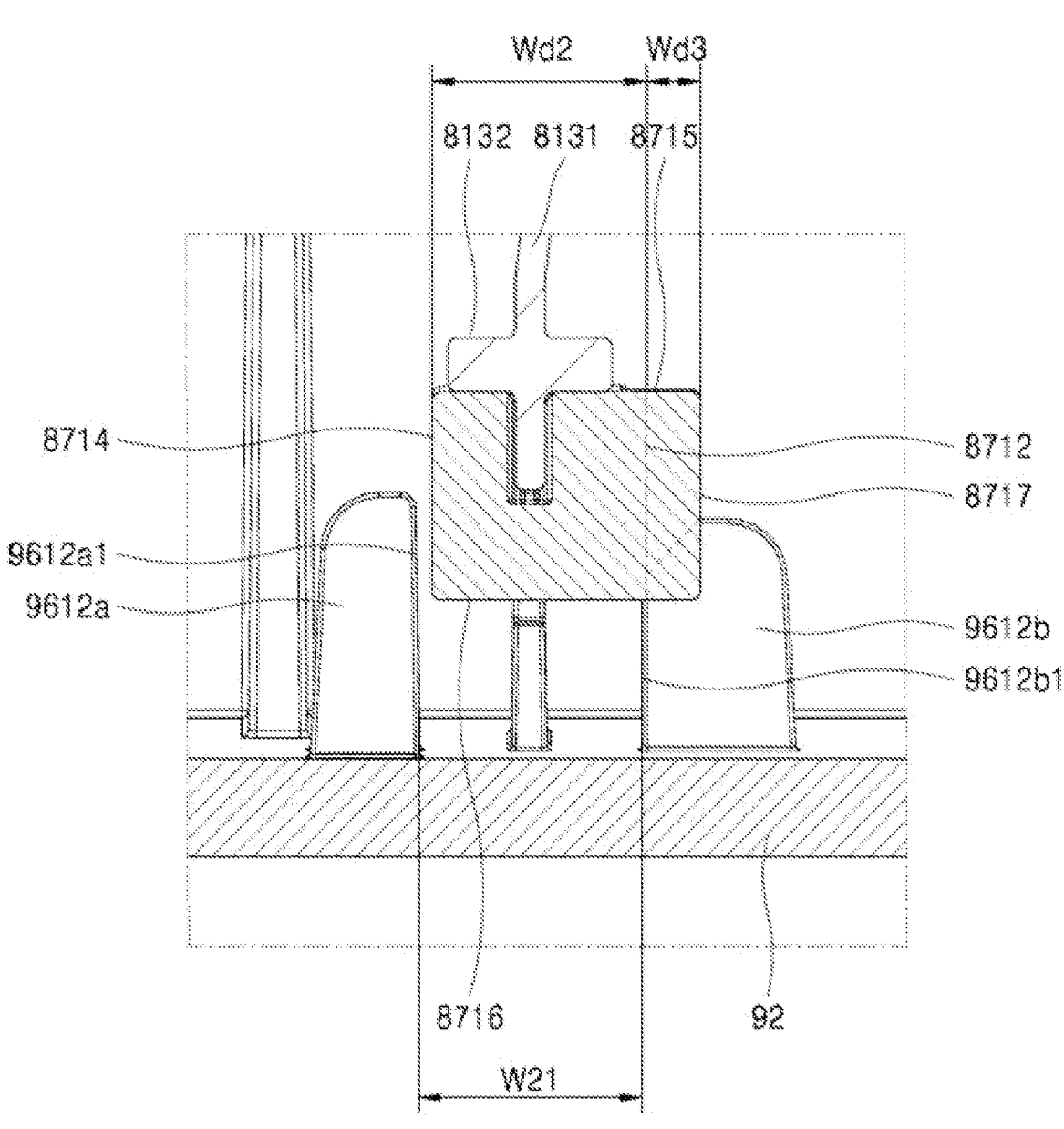
FIGS. 11 and 12 are partially enlarged views of FIG. 10.

As illustrated in FIGS. 8 and 11, the plurality of first support ribs 961 arranged around the first damper 871 may comprise a plurality of main ribs 9611 that is spaced apart from each other in the horizontal direction D1, with the first damper 871 therebetween, to support the first damper 871 in the horizontal direction D1 and the gravitational direction.

For example, the plurality of main ribs 9611 may be comprised of a pair of main ribs 9611 that is spaced from each other in the horizontal direction D1, with the first damper 871 therebetween. For convenience, out of the pair of main ribs 9611, one disposed to face a first lateral surface 8711 of the first damper 871 is referred to as a first main rib 9611a, and the other disposed to face a third lateral surface 8713 of the first damper 871 is referred to as a second main rib 9611b.

The first main rib 9611a and the second main rib 9611b may have shapes that are symmetrical to each other, with the first damper 871 therebetween. Specifically, the first main rib 9611a and the second main rib 9611b may be configured to protrude and extend upward from the bottom surface 91 of the base 90, and their thicknesses in the horizontal direction D1 may be less than their widths in the longitudinal direction D2 and their heights in the up-down direction.

An inclination surface 9611a1, 9611b1 may be formed at the upper end of the support surface of the first main rib 9611a and at the upper end of the support surface of the second main rib 9611b. The inclination surfaces 9611a1, 9611b1 may be provided in such a way that a gap between the inclinations surfaces gradually decreases in a downward direction. The inclination surfaces 9611a1, 9611b1 ensure ease of downward entry of the first damper 871.

In succession of the inclination surfaces 9611a1, 9611b1, a L-shaped step surface 9611a2, 9611b2 may be formed at the lower sides of the inclination surfaces 9611a1, 9611b1. The step surface 9611a2, 9611b2 may comprise a perpendicular surface 9611a3, 9611b3 and a horizontal surface 9611a4, 9611b4.

The perpendicular surface 9611a3 of the first main rib 9611a and the perpendicular surface 9611b3 of the second main rib 9611b respectively are portions that directly contact the first lateral surface 8711 of the first damper 871 and the third lateral surface 8713 of the first damper 871. The first lateral surface 8711 and the third lateral surface 8713 of the first damper 871 becomes fitted between the perpendicular surface 9611a3 of the first main rib 9611a and the perpendicular surface 9611b3 of the second main rib 9611b. Accordingly, a horizontal D1 movement of the first damper 871 may be limited, and a horizontal D1 support structure may be achieved.

The horizontal surface 9611a4 of the first main rib 9611a and the horizontal surface 9611b4 of the second main rib 9611b respectively are portions that directly contact the lower surface of the first damper 871. Accordingly, a downward movement of the first damper 871 may be limited, and a downward support structure may be achieved.

Further, the plurality of first support ribs 961 arranged around the first damper 871 may further comprise a plurality of sub ribs 9612 that is spaced from each other in the longitudinal direction D2, with the first damper 871 therebetween, to support the first damper 871 in the longitudinal direction D2.

For convenience, out of the plurality of sub ribs 9612, one disposed relatively far from the connection duct is referred to as a first sub rib 9612a, and the other is referred to as a second sub rib 9612b. In the state illustrated in FIG. 8, the first sub rib 9612a is arranged toward a fourth lateral surface 8714 of the first damper 871, in parallel with the fourth lateral surface 8714, and the second sub rib 9612b is arranged toward the second lateral surface 8712 of the first damper 871, in parallel with the second lateral surface 8712.

The first sub rib 9612a and the second sub rib 9612b may be provided to face each other, with the first damper 871 therebetween. Like the main rib 9611, the first sub rib 9612a and the second sub rib 9612b are configured to protrude and extend from the bottom surface 91 of he base 90 in the upward direction.

However, the thicknesses of the first sub rib 9612a and the second sub rib 9612b in the horizontal direction D1 may be less than the widths thereof in the longitudinal direction D2 and the heights thereof in the up-down direction, to support the first damper 871 in the longitudinal direction D2.

Since the first sub rib 9612a and the second sub rib 9612b are provide to support the first damper 871 in the longitudinal direction D2, the sub rib 9612 may have a support rib 9612a1, 9612b1 that is provided with no step surface and is comprised only of an inclination surface and a perpendicular surface, unlike the main rib 9611.

Additionally, in the case where the drying air supply part 80 is disposed completely as illustrated in FIG. 11, the support surface 9612b1 of the second sub rib 9612b is configured to directly contact the second lateral surface 8712 of the first damper 871, but the support surface 9612a1 of the first sub rib 9612a may be configured to keep spaced from the fourth lateral surface 8714 of the first damper 871 while forming a predetermined gap.

As described above, as the upper end portion 8511 of the duct main body 851 of the connection duct part 85 is fixed to the wash tub 20, an up-down movement of the rear end side of the heater housing 81 is limited by the duct main body 851, and the heater housing 81 is fixed by the duct main body 851.

At this time, a position at which the up-down movement of the heater housing 81 is limited is eccentric to the rear end of the heater housing 81 from the center of the heater housing 81.

In the case where an external impact is applied in a drop test and the like, since the front end side of the heater housing 81 is not fixed to the base 90 and the wash tub 20, rotation moment is applied around the upper end portion 8511 of the connection duct part 85 as a center.

Figure 10:
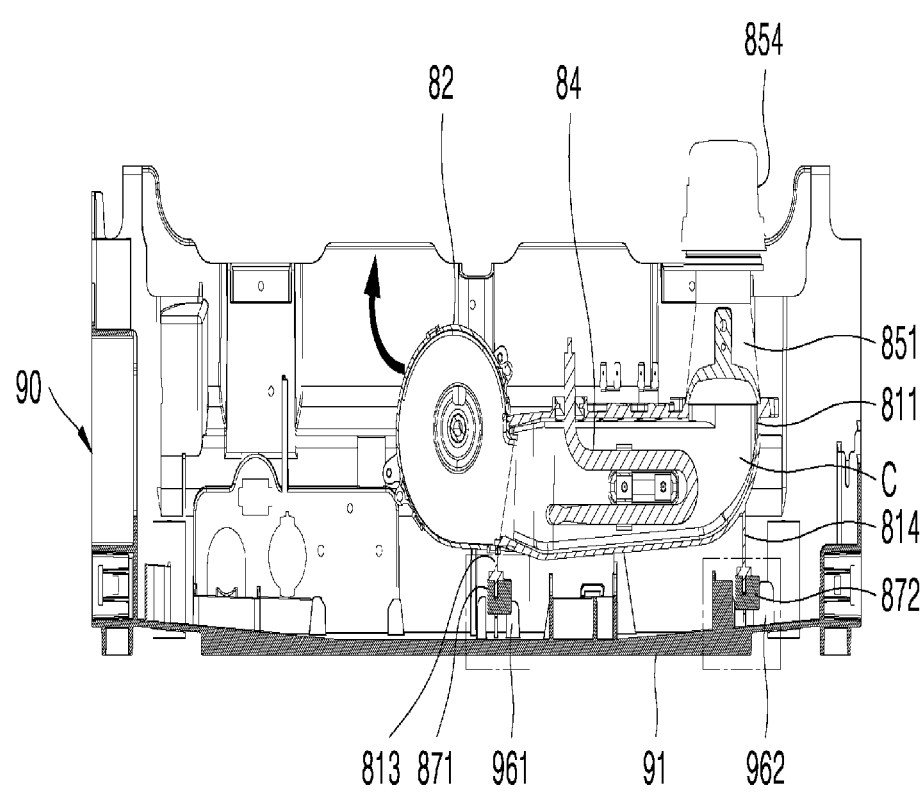
FIG. 10 is a cross-sectional view of the drying air supply part and the base of FIG. 3, which are cut along line A-A.

Based on the rotation moment, the front end side of the heater housing 81 receives a force of rotating and moving upward in a direction of the arrow illustrated in FIG. 10.

The first sub rib 9612a, as described above, serves as a stopper of the first damper 871 for suppressing a rotation or an upward movement of the front end side of the heater housing 81.

Additionally, the first sub rib 9612*a* may be configured to keep directly contacting the fourth lateral surface 8714 of the first damper 871, but as illustrated, preferably configured to absorb the tolerance of the first damper 871 and the tolerance of the first support rib 961 by forming a predetermined gap as illustrated.

Figure 9:
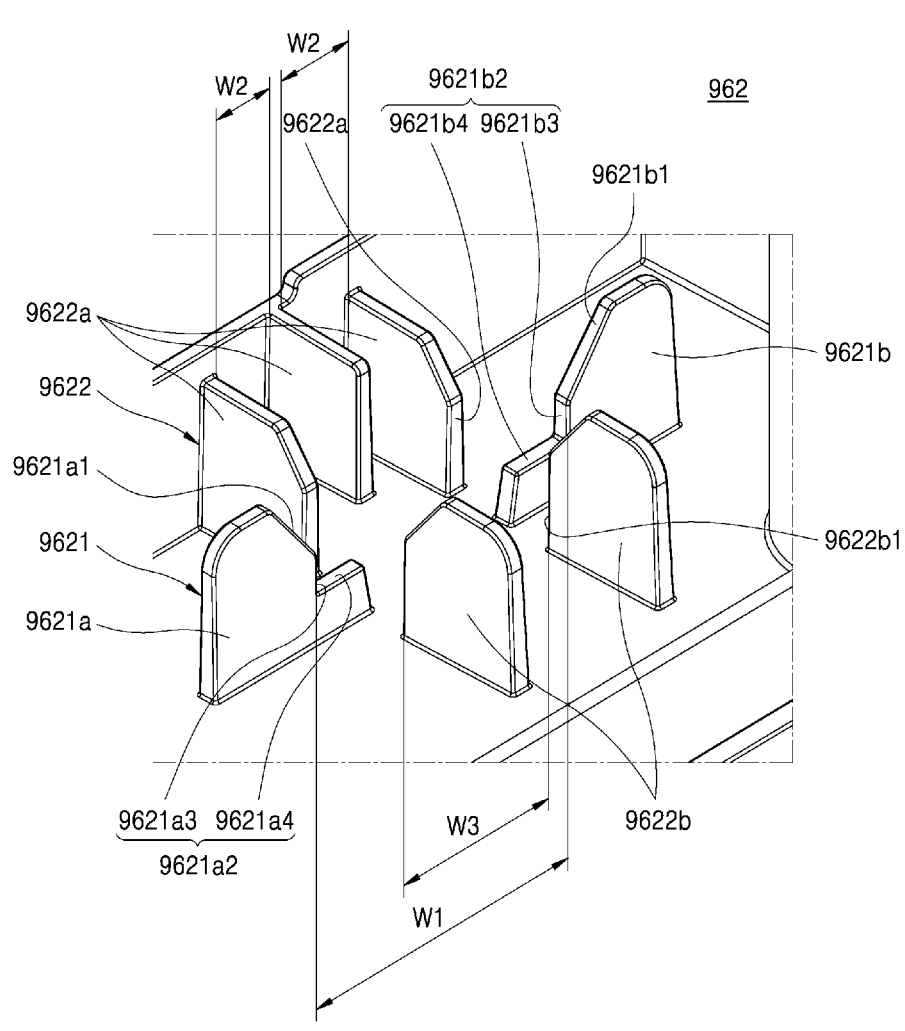
Figure 12:
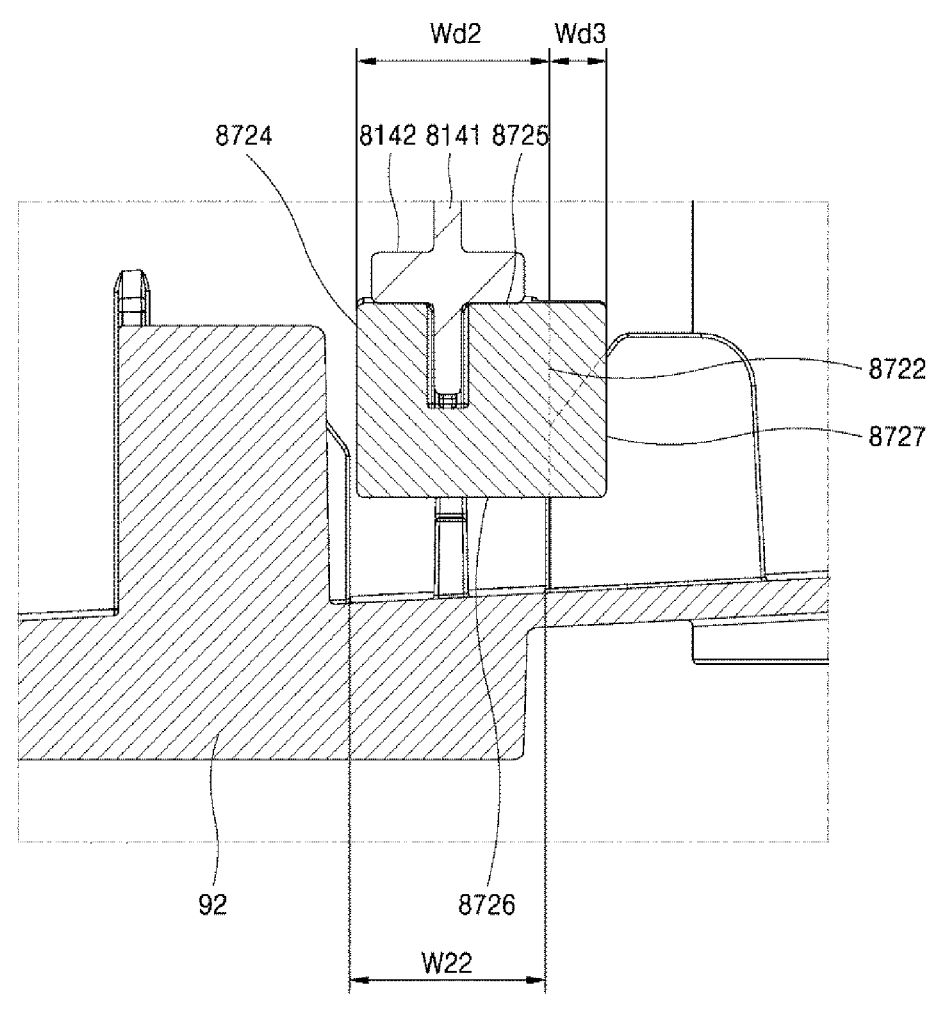

Further, as illustrated in FIGS. 9 and 12, the plurality of second support ribs 962 arranged around the second damper 872 may comprise a plurality of main ribs 9621 that is spaced from each other in the horizontal direction D1, with the second damper 872 therebetween, to support the second damper 872 in the horizontal direction D1 and the gravitational direction.

The plurality of main ribs 9621 may be comprised of a pair of main ribs 9621 that is spaced from each other in the horizontal direction D1, with the second damper 872 therebetween. Like the first support rib 961, out of the pair of main ribs 9621, one disposed toward the first lateral surface 8721 of the second damper 872 is referred to as a first main rib 9621*a*, and the other disposed toward the third lateral surface 8723 of the second damper 872 is referred to as a second main rib 9621*b*.

The first main rib 9621*a* and the second main rib 9621*b* may be provided to have shapes that are symmetrical to each other, with the second damper 872 therebetween. Specifically, the first main rib 9621*a* and the second main rib 9621*b* may be configured to protrude and extend upward from the bottom surface 91 of the base 90, and their thicknesses in the horizontal direction D1 may be less than their widths in the longitudinal direction D2 and their heights in the up-down direction.

An inclination surface 9621*a*1, 9621*b*1 may be formed at the upper end of the support surface of the first main rib 9621*a* and at the upper end of the support rib of the second main rib 9621*b*. The inclination surfaces 9621*a*1, 9621*b*1 may be provided in such a way that a gap between the inclination surfaces 9621*a*1, 9621*b*1 gradually decreases in the downward direction. The inclination surfaces 9621*a*1, 9621*b*1 may ensure easy of downward entry of the second damper 872.

In succession of the inclination surface 9621*a*1, 9621*b*1, a L-shaped step surface 9621*a*2, 9621*b*2 may be formed at the lower side of the inclination surface 9621*a*1, 9621*b*1. The step surface 9621*a*2, 9621*b*2 may comprise a perpendicular surface 9621*a*3, 9621*b*3.

The perpendicular surface 9621*a*3 of the first main rib 9621*a* and the perpendicular surface 9621*b*3 of the second main rib 9621*b* are respectively portions that directly contact the first lateral surface 8721 of the second damper 872 and the third lateral surface 8723 of the second damper 872. The first lateral surface 8721 and the third lateral surface 8723 of the second damper 872 become fitted between the perpendicular surface 9621*a*3 of the first main rib 9621*a* and the perpendicular surface 9621*b*3 of the second main rib 9621*b*. Accordingly, a horizontal D1 movement of the second damper 872 may be limited, and a horizontal D1 support structured may be achieved.

The horizontal surface 9621*a*4 of the first main rib 9621*a* and the horizontal surface of the second main rib 9621*b* respectively are portions that directly contact the lower surface of the second damper 872. Accordingly, a downward movement of the second damper 872 may be limited, and a downward support structure may be achieved.

Further, the plurality of second support ribs 962 arranged around the second damper 872 may further comprise a plurality of sub ribs 9622 that is spaced from each other in the longitudinal direction D2, with the second damper 872 therebetween, to support the second damper 872 in the longitudinal direction D2.

Like the first support rib 961, out of the plurality of main ribs, one disposed toward the fourth lateral surface 8724 of the second damper 872 in parallel with the . . . is referred to as a first sub rib 9622*a*, and the other disposed toward the second lateral surface 8722 of the second damper 872 in parallel with the . . . is referred to as a second sub rib 9622*b*.

The first sub rib 9622*a* and the second sub rib 9622*b* may be provided to face each other, with the second damper 872 therebetween. Like the main rib, the first sub rib 9622*a* and the second sub rib 9622*b* are configured to protrude and extend upward from the bottom surface 91 of the base 90.

However, the thicknesses of the first sub rib 9622*a* and the second sub rib 9622*b* in the horizontal direction D1 may be less than the widths thereof in the longitudinal direction D2 and the heights thereof in the up-down direction, to support the second damper 872 in the longitudinal direction D2.

Since the first sub rib 9622*a* and the second sub rib 9622*b* are configured to support the second damper 872 in the longitudinal direction D2, the sub rib 9622 may have a support surface 9622*a*1, 9622*b*1 that is provided with no step surface and is comprised only of an inclination surface and a perpendicular surface, unlike the support the main ribs.

In the case where the second damper 872 is disposed completely as illustrated in FIG. 12, the perpendicular surface of the first sub rib 9622*a* and the perpendicular surface of the second sub rib 9622*b* respectively contact the fourth lateral surface 8724 of the second damper 872 and the second lateral surface 8722 of the second damper 872. Accordingly, a longitudinal D2 support structure of the second damper 872 may be achieved.

Additionally, the support rib 9612 of the first support rib 961 and the sub rib 9622 of the second support rib 962 respectively define directionality where the first damper 871 and the second damper 872 are installed, to prevent misassembly of the drying air supply part 80.

As illustrated in FIG. 8, a distance W12 between the first sub ribs 9612*a* of the first support rib 961 in the horizontal direction D1 is less than a distance W13 between the second sub ribs 9622*b* of the first support rib 961 in the horizontal direction D1.

At this time, a width Wd3 of the projection part 8717 of the first damper 871 in the horizontal direction D1 is greater than the distance W12 between the first sub ribs 9612*a* in the horizontal direction D1 and less than the distance W13 between the second sub ribs 9622*b* in the horizontal direction D1.

Further, a longitudinal width Wd2+Wd3 of the first damper 871 comprising the projection part 8717 is greater than a longitudinal distance W21 between the second sub ribs.

Accordingly, the projection part 8717 of the first damper 871, as illustrated in FIG. 11, may be disposed to extend between the second sub ribs 9612*b*, but cannot be physically disposed between the first sub ribs 9612*a*. Thus, the misassembly of the first damper 871 may be prevented effectively.

Likewise, a distance W12 between the first sub ribs 9622*a* of the second support rib 962 in the horizontal direction D1 is less than a distance W13 between the second sub ribs 9622*b* of the second support rib 962 in the horizontal direction D1, as illustrated in FIG. 9.

At this time, a width Wd3 of the projection part 8727 of the second damper 872 in the horizontal direction D1 is greater than the distance W12 between the first sub ribs 9622*a* in the horizontal direction D1 and less than the distance W13 between the second sub ribs 9622*b* in the horizontal direction D1.

Further, a longitudinal width Wd2+Wd3 of the second damper 872 comprising the projection part 8717 is greater than a longitudinal distance W22 between the second sub ribs.

Accordingly, the projection part 8727 of the second damper 872, as illustrated in FIG. 12, may be disposed to extend between the second sub ribs 9622*b*, but cannot be physically disposed between the first sub ribs 9622*a*. Thus, the misassembly of the second damper 872 may be prevented effectively.

As described above, the first damper 871 and the second damper 872 are respectively disposed in such a way that the first damper 871 and the second damper 872 are only supported by the first support rib 961 and the second support rib 962 and keep contacting the first support rib 961 and the second support rib 962. That is, no additional means of fixing and fastening the first damper 871 and the second damper 872 to the base 90 is provided.

Thus, a manufacturing process for fastening the drying air supply part 80 to the base 90 may be simplified and manufacturing costs may decrease significantly.

The embodiments are described above with reference to a number of illustrative embodiments thereof. However, embodiments are not limited to the embodiments and drawings set forth herein, and numerous other modifications and embodiments can be drawn by one skilled in the art within the technical scope of the disclosure. Further, predictable effects based on the configurations in the disclosure are to be included within the range of the disclosure though not explicitly described in the description of the embodiment.

The invention claimed is:

1. A dishwasher, comprising:
a tub that defines a wash space and is configured to receive one or more dishware items;
a drying air supply assembly disposed at a lower side of the tub, the drying air supply assembly being configured to generate drying air to thereby dry the one or more dishware items and supply the drying air into the tub;
a base disposed at a lower side of the drying air supply assembly; and
one or more dampers disposed between the drying air supply assembly and the base,
wherein the drying air supply assembly comprises:
a fan configured to generate an air flow,
a heater housing that defines an air passage, an inlet, and an outlet, wherein the inlet receives an air from the air flow and the air is discharged through the outlet,
a heater configured to heat the air, wherein a portion of the heater is disposed at the air passage,
a first leg comprising a first end and a second end, wherein the first end of the first leg is connected to a lower side of the inlet and the second end of the first leg extends toward the base, and
a second leg comprising a first end and a second end, wherein the first end of the second leg is connected to a lower side of the outlet and the second end of the second leg extends toward the base, and
wherein a length of the heater housing between the inlet defined at a front end of the heater housing and the outlet defined at a rear end of the heater housing in a longitudinal direction of the heater housing is greater than a length of the heater housing in a horizontal direction relative to the base, the horizontal direction being perpendicular to the longitudinal direction.

2. The dishwasher of claim 1, wherein the drying air supply assembly is spaced apart from the base with the one or more dampers therebetween.

3. The dishwasher of claim 1, wherein the one or more dampers are made of an elastic material.

4. The dishwasher of claim 1, wherein the first leg and the second leg each comprises a sheet-shaped perpendicular extension portion,
wherein an upper end of the sheet-shaped perpendicular extension portion is connected to the heater housing and a lower end of the sheet-shaped perpendicular extension portion extends toward the base, and
wherein a width of the sheet-shaped perpendicular extension portion in the horizontal direction is greater than a thickness of the sheet-shaped perpendicular extension portion in the longitudinal direction.

5. The dishwasher of claim 4, wherein the first leg and the second leg each comprises a sheet-shaped horizontal extension portion that is (i) disposed at the lower end between a first side and a second side of the sheet-shaped perpendicular extension portion and (ii) extends in the longitudinal direction.

6. The dishwasher of claim 1,
wherein the one or more dampers comprise:
a first damper coupled to the second end of the first leg; and
a second damper coupled to the second end of the second leg,
wherein a horizontal extension portion of the first leg is in contact with an upper surface of the first damper, and
wherein a horizontal extension portion of the second leg is in contact with an upper surface of the second damper.

7. The dishwasher of claim 6, wherein the first damper and the second damper have the same exterior shape and the same size.

8. The dishwasher of claim 7, wherein the first damper and the second damper are configured to be used interchangeably and couple to the first leg or the second leg.

9. The dishwasher of claim 6, wherein the base comprises:
a plurality of first support ribs arranged around the first damper; and
a plurality of second support ribs arranged around the second damper.

10. The dishwasher of claim 9, wherein the drying air supply assembly comprises a connection duct, wherein a first end of the connection duct is connected to the outlet of the heater housing and a second end of the connection duct is fixed to the tub, and
wherein the connection duct and one or more of the plurality of second support ribs restrict an up-down movement of a rear end of the heater housing.

11. The dishwasher of claim 10, wherein the plurality of first support ribs comprise:
a plurality of main ribs spaced apart from each other in the horizontal direction, wherein the first damper is disposed between the plurality of main ribs and the plurality of main ribs support the first damper in the horizontal direction and a gravitational direction; and
a plurality of sub ribs spaced apart from each other in the longitudinal direction, wherein the first damper is disposed between the plurality of sub ribs and the plurality of sub ribs support the first damper in the longitudinal direction.

12. The dishwasher of claim 11, wherein the plurality of sub ribs comprise a plurality of first sub ribs and a plurality of second sub ribs, wherein the plurality of first sub ribs are spaced apart from each other in the longitudinal direction and the plurality of second sub ribs are spaced apart from each other in the longitudinal direction, wherein the plurality of first sub ribs are disposed farther from the connection duct in the longitudinal direction than the plurality of second sub ribs, and wherein the plurality of first sub ribs are not in contact with the first damper.

13. The dishwasher of claim 12, wherein the plurality of second sub ribs are in contact with the first damper.

14. The dishwasher of claim 12, wherein the first damper comprises a projection portion that is disposed at an outer surface of the first damper and that protrudes in the longitudinal direction, and wherein a width of the projection portion in the horizontal direction is greater than a distance between the plurality of first sub ribs in the horizontal direction and less than a distance between the plurality of second sub ribs in the horizontal direction.

15. The dishwasher of claim 14 wherein the projection portion protrudes between the plurality of second sub ribs.

16. The dishwasher of claim 9, wherein the plurality of second support ribs comprise:

a plurality of main ribs spaced apart from each other in the horizontal direction, wherein the second damper is disposed between the plurality of main ribs and the plurality of main ribs support the second damper in the horizontal direction and a gravitational direction; and a plurality of sub ribs spaced apart from each other in the longitudinal direction, wherein the second damper is disposed between the plurality of sub ribs and the plurality of sub ribs support the second damper in the longitudinal direction.

17. The dishwasher of claim 16, wherein the plurality of sub ribs comprise a plurality of first sub ribs and a plurality of second sub ribs, wherein the plurality of first sub ribs are spaced apart from each other in the longitudinal direction, wherein the plurality of second sub ribs are spaced apart from each other in the longitudinal direction, and wherein the plurality of first sub ribs and the plurality of second sub ribs are in contact with the second damper.

18. The dishwasher of claim 17, wherein the second damper comprises a projection portion that is disposed at an outer surface of the second damper and that protrudes in the longitudinal direction, and wherein a width of the projection portion in the horizontal direction is greater than a distance between the plurality of first sub ribs in the horizontal direction and less than a distance between the plurality of second sub ribs in the horizontal direction.

19. The dishwasher of claim 18, wherein the projection portion is disposed between the plurality of second sub ribs.

* * * * *